(12) United States Patent
Rosendahl et al.

(10) Patent No.: US 6,330,701 B1
(45) Date of Patent: Dec. 11, 2001

(54) METHOD RELATING TO PROCESSORS, AND PROCESSORS ADAPTED TO FUNCTION IN ACCORDANCE WITH THE METHOD

(75) Inventors: Michael Rosendahl, Farsta; Tomas Lars Jonsson, Sodertalje; Per Anders Holmberg, Stockholm, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/207,765

(22) Filed: Dec. 9, 1998

(30) Foreign Application Priority Data

Dec. 12, 1997 (SE) .................................................. 97 04606

(51) Int. Cl.$^7$ ............................ H03M 13/00; G06F 7/02; H02H 3/05
(52) U.S. Cl. ............................ 714/757; 714/820; 714/11; 708/534
(58) Field of Search ..................................... 714/757, 820, 714/11, 821, 819, 758, 800, 751, 49, 52, 23, 34, 24, 2, 10, 12, 25; 708/530, 531, 534

(56) References Cited

U.S. PATENT DOCUMENTS

| | | | |
|---|---|---|---|
| 4,345,328 | * 8/1982 | White | 714/758 |
| 4,358,823 | 11/1982 | McDonald et al. | 714/11 |
| 4,672,537 | * 6/1987 | Katzman et al. | 714/56 |
| 4,916,696 | 4/1990 | Funakubo | 714/11 |
| 6,065,135 | * 5/2000 | Marshall et al. | 714/11 |

FOREIGN PATENT DOCUMENTS 0 433 979A2    6/1991  (EP) .

* cited by examiner

Primary Examiner—Christine T. Tu
(74) Attorney, Agent, or Firm—Burns, Doane, Swecker & Mathis, L.L.P.

(57) ABSTRACT

The present invention relates to a method of utilizing information made available in a bit error check of data words belonging to instructions read into a processor having a first (11) and a second (11') calculating unit which operate in parallel with one another, a so-called double processor mode. The processor structure also comprises a third and a fourth calculating unit (13, 13') intended for continuously checking for possible bit errors in read-in data words, a comparator (14) for comparing output data from parallel operating units (11, 11'), a diagnostic unit (15) adapted to determine which of the calculating units delivered correct output data when detecting a difference in output data in the comparator (14), and a control unit (16) adapted to control that the output data from the processor structure (1) originates from a calculating unit that has delivered correct output data. The processor switches to a single processor mode when a difference in output data is detected in the comparator. The data words are read directly into respective calculating units (11, 11') without correction for possible bit errors when the processor operates in a double processor mode, and the information from the third and fourth calculating units (13, 13') is used to effect said determination in the diagnostic unit (15). Bit error control and bit error correction are used in a known manner when the processor operates in a single processor mode.

20 Claims, 1 Drawing Sheet

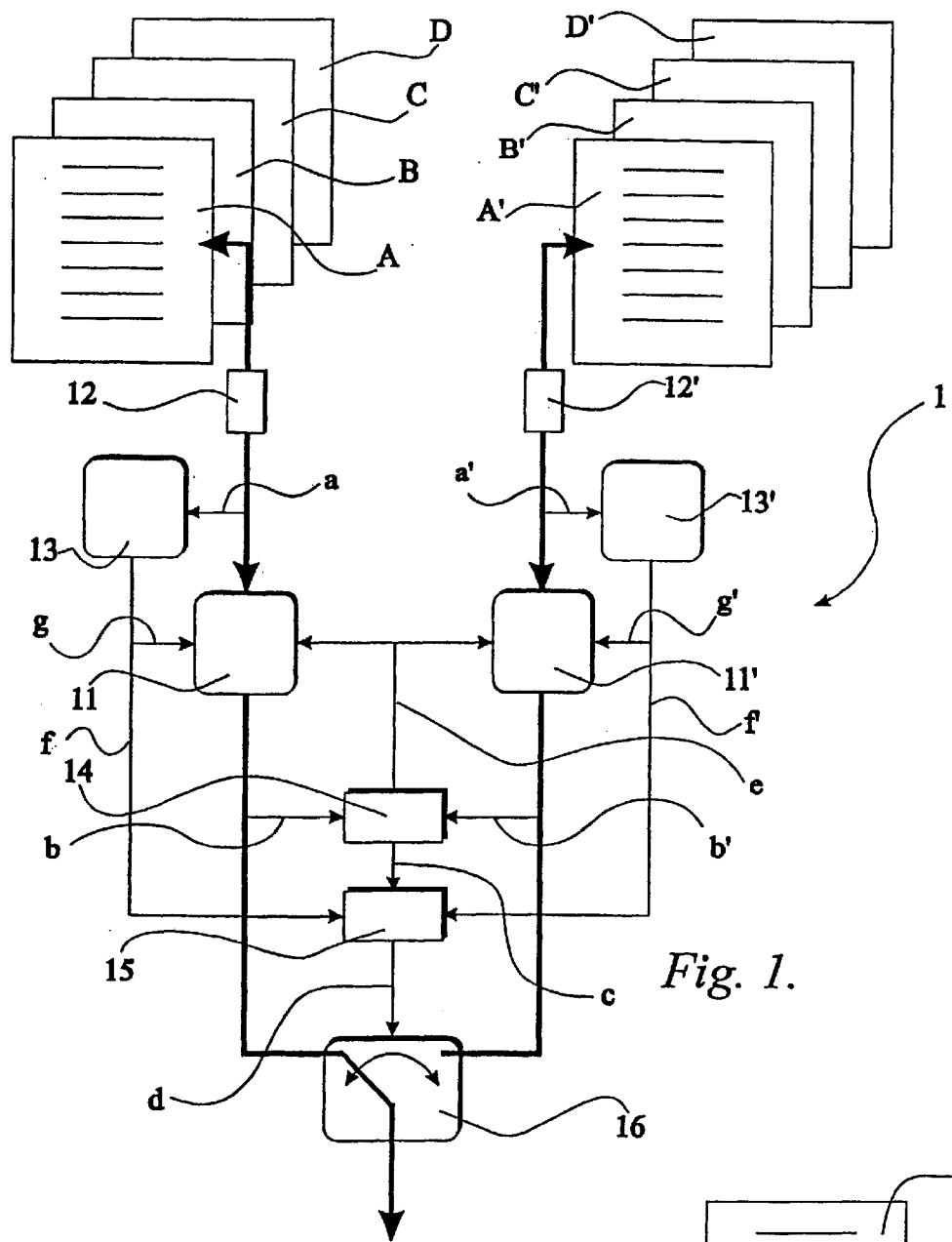
*Fig. 1.*
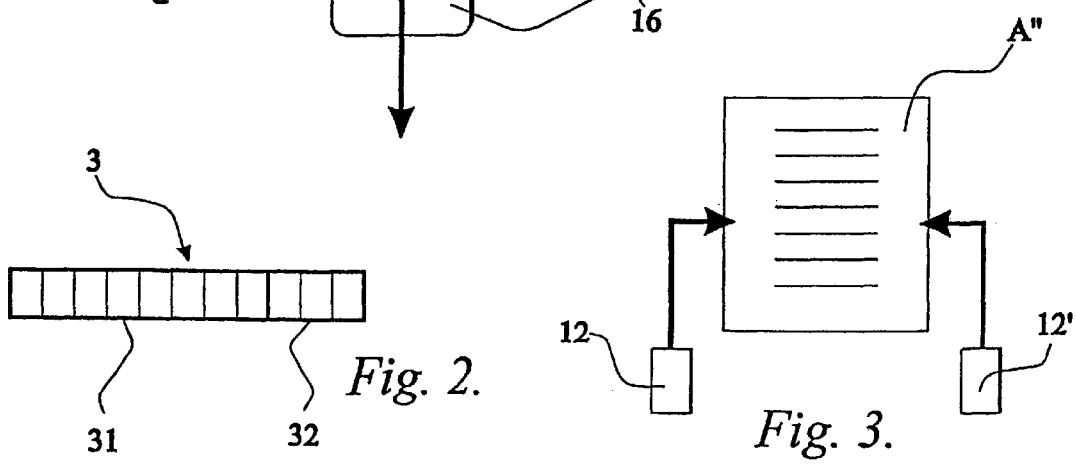
*Fig. 2.*
*Fig. 3.*

METHOD RELATING TO PROCESSORS, AND PROCESSORS ADAPTED TO FUNCTION IN ACCORDANCE WITH THE METHOD

FIELD OF INVENTION

The present invention relates to a method of utilizing information that is made available when carrying out a bit error check in data words relating to instructions read into a processor.

The method is particularly adapted for application with a processor that includes first and second calculating units that work in parallel with one another, a first reading unit adapted to read data words into the first calculating unit, and a second reading unit which is adapted to read data words into the second calculating unit.

The present invention also relates to a processor that is adapted to work in accordance with the inventive method.

BACKGROUND OF THE INVENTION

It has long been known that processor structures may even include third and fourth calculating units intended for continuously checking for the presence of bit errors in the data words used. Processor structures of this kind can be said to function in a double processor mode.

A processor structure may also include a comparator for comparing output data from the parallel-operating calculating units, a diagnostic unit which is adapted to ascertain or determine which of the two calculating units has delivered correct output data when a difference between output data is detected in the comparator, and a control unit which is adapted to ensure that output data from the processor structure originates from a calculating unit that has delivered correct output data.

The two parallel-operating calculating units await the result of the determination of the diagnostic unit when a difference is detected in the comparator, whereafter the calculating unit that has delivered correct output data continues to operate after the result of the determination has been received.

The calculating unit that has delivered incorrect output data is stopped and subjected to a start-up routine, wherewith the stopped calculating unit is brought into phase with the calculating unit that continues to operate and can then be restarted for parallel operation with the calculating unit that was not stopped. When only one calculating unit is in operation, it is said that the processor structure generally operates as a "single mode processor". By stopped is not meant that the calculating unit ceases to operate and is switched-off, but that the calculating unit concerned is stopped from performing standard execution work and, instead, switches to a mode in which it carries out various self-checks and/or the aforesaid start-up routine.

By calculating unit is meant in this document a unit for processing or executing instructions or data words read into said unit, such as a processor or an ALU (Arithmetic Logical Unit) within a processor.

It has long been known to use error correction in a double processor mode for correcting bit errors in the data words that are inputted on the programme code and, when diagnosing which processor has delivered an erroneous result in the event of a difference between the results delivered by the two processors, to ascertain or determine which processor has delivered the wrong result.

There are normally used in a system that is very sensitive to processor disturbances two parallel processors which perform precisely the same operations.

The results obtained from the two processors with each executed instruction are compared and the results are considered to be correct when said results are identical.

When the results differ, it is assumed that one processor has made an incorrect calculation and it is then necessary to establish which of the processors has delivered a wrong result.

When a difference is detected there is used a diagnostic method which identifies the processor that has delivered an incorrect result. The maximum time for carrying out this method is 20 ms, in which time none of the processors carries out a calculating or executing operation with respect to input instructions, but stand idle and carry out certain self-diagnosing operations, for instance.

When it has been established which of the processors has delivered the incorrect result, the correct processor continues to execute incoming instructions as a single mode processor.

The system is extremely vulnerable during this time period, since there is no control for ascertaining whether the result from this single processor is correct or not.

The stopped processor must therefore be restarted as soon as possible. This is achieved with a specific start-up routine in which the stopped processor is restarted and brought into phase with the correct processor.

This start-up routine takes several minutes to carry out and includes total rewriting of all memories belonging to the stopped processor, these memories being allotted the same information as that present in the memories of the correct processor.

When the content of all memories in the stopped processor is identical with the content of the memories belonging to the correct processor, the stopped processor can be restarted and the system switched from a single processor mode back to a double processor mode.

In respect of incorrectly executed instructions, the highest error frequency normally occurs in conjunction with reading from the memories in so-called memory accesses. This is because several different memories operate around a processor and because the memories have a high error frequency per se.

It is known to use traditional error correction to reduce the number of errors caused by erroneous memory accesses when reading-in instructions from the programme code.

Traditional error correction is effected by using a plurality of check bits for each data word when reading-in instructions, these check bits enabling an algorithm to check whether or not the instruction read-in is correct. When a data word is incorrectly read-in, the check bits are used for error correction of the data word.

In simple terms, it can be said that the error correction can turn out in three different ways:

an error is found and corrected;

an error is found and cannot be corrected; or an error is found and corrected erroneously.

Another possibility is that the data word read-in contains a bit error which is not discovered by the error correction algorithm.

The first outturn results in a correct data word being read into the processor with no error occurring.

The second outturn results in an incorrect data word being read into the processor and culminating in a difference in the result from the parallel operating processors.

The diagnosing procedure is simplified in this case, since the result obtained with the error correction algorithm shows that one data word was incorrect.

In the third outturn, an incorrect data word is read into the processor, resulting in a difference in the result obtained from the parallel processors. The diagnosing procedure receives no assistance from the error correction algorithm in this case, since the algorithm shows that the data word read-in was correct (corrected). The likelihood of this third outturn is normally very remote.

When a bit error in a data word read into a processor is not discovered, the same situation arises as that in the afore described third event.

A memory access procedure normally has a duration of about five to six data cycles, of which one data cycle is used for error correction.

When the instruction flow is continuous, the additional time required by this data cycle makes no difference, since the instructions arrive mutually sequentially.

In the event of a sequence interruption in reading-in instructions, such as in the event of a jump instruction, it is necessary to re-access the memory from an address unknown prior to the sequence interruption.

This results in a time lapse in the read-in sequence that corresponds in duration to the duration of the access time, thus a duration in the order of from five to six data cycles.

Error correction is performed by ALU that is not included in the standard execution work in the processor, but which is used solely for error correction. This correction process does not therefore take capacity from the remainder of the processor. However, it is necessary to wait for the result before the instruction can be considered usable within the standard processor.

Gains corresponding to parts of one percent in input time are considered significant advancements with regard to increased efficiency with essentially retained system reliability.

About 10% of all instructions that are read in from the programme code consist of different sorts of jump instructions, which are instructions that cause so-called sequence interruptions in reading instructions into the calculating units.

The sequentially read-in instructions each take-up one data cycle, whereas a jump instruction takes-up in the region of six data cycles, due to the sequence-interruptions in read-in instructions constituted by a jump instruction.

An object of the present invention is to generally reduce the additional time consumed by a sequence interruption without needing to affect system reliability in a negative manner.

If each jump instruction can be caused to take-up five data cycles instead of six data cycles for instance, this will result in an average reduction of one data cycle per fifteen data cycles in the total instruction input, which corresponds to 6.7% of the total input time. This represents a considerable time saving in the present contexts.

Publications U.S. Pat. Nos. 4,358,823, 4,916,696 and EP-A2-0 433 979 also describes the background of the invention.

SUMMARY OF THE INVENTION
Technical Problems

When studying the background art as described above, it will be seen that a technical problem is one of enabling instructions to be read into the processor more effectively while essentially maintaining the reliability of the system and with a relatively short time loss in diagnosing which calculating unit has delivered correct output data when a difference in the output data from said two parallel operating calculating units has been detected.

Another technical problem is one of creating conditions in which a balance is achieved between system reliability and system efficiency.

Another technical problem is one of enabling the number of data cycles required to read data words into a processor to be reduced without needing to reduce the reliability or efficacy of the system as a whole.

Another technical problem is one of enabling a balance to be achieved between req-uisite system reliability and desired efficiency even when the data words are read directly into respective calculating units uncorrected with respect to possible bit errors.

Yet another technical problem is one of enabling information obtained with bit error controls to be utilized without needing to wait for the result from the third calculating unit, i.e. the result from the bit error control, when reading data words into the two calculating units operating in parallel.

Another technical problem is one of enabling the necessary balance between system reliability and system efficiency to be achieved when a processor structure is used both as a double mode processor and as a single mode processor, and to adapt the reliability level and therewith enhance efficiency in both instances.

Still another technical problem is one of generally maintaining the reliability level of the system and to make inputting of data words more effective, by using essentially known error correction algorithms for bit error correction and determination methods for diagnosing which calculating unit has delivered correct output data in the event of a difference in the output data from the two parallel-operating calculating units.

Another technical problem is one of enabling a processor, or a processor structure, to be adapted for operation in accordance with the inventive method.

With regard to such a process structure, a technical problem resides in the provision of means and measures that will enable the calculating units and other units included in the system to mutually co-act so as to provide a first reliability level when operating in a double processor mode and a second reliability level when operating in a single processor mode, where both reliability levels are satisfactory and primarily where operation in a double processor mode is made more effective in relation to known technology.

Another technical problem is one of providing a processor or processor structure in accordance with the a foregoing without needing to add essentially new units or functions in relation to known technology.

Solution

With the intention of solving one or more of the aforesaid technical problems, the present invention takes as its starting point a method and a processor according to the technical field described in the introduction. With the further intention of reducing the number of data cycles required with a memory access and to enter a data word into a calculating unit, it is proposed that the data word is entered directly into respective calculating units uncorrected with regard to possible bit errors while said first and said second calculating units both operate in parallel. This means that one data cycle will be saved with respective access operations, resulting in a time gain in the case of jump instructions that cause an interruption in the read-in sequence.

As a result of reading-in uncorrected data words, a plurality of erroneous data words will read-in and therewith even more differences detected between the data outputted from the two calculating units that operate in parallel. According to the present invention, the information contained in the third and the fourth calculating units respectively shall be utilized to ascertain which of the two calculating units has delivered correct output data when a difference is detected.

According to the invention, when a data word that contains a bit error has been read into one of the two parallel-operating calculating units, said information is utilized by considering the output data from said calculating unit to be incorrect, which considerably simplifies determination on the part of the diagnostic unit when a detected difference is due to an erroneously read-in data word.

With the intention of maintaining desired, high system reliability when one of the two calculating units operating in parallel is stopped, it is proposed in accordance with the invention that the information obtained from the third or the fourth calculating unit is used to correct bit errors in data words that may have been read-in erroneously before respective data words are read into the first or the second calculating unit operating in a single processor mode, and that the third and fourth calculating units are adapted to carry out this error correction. Efficiency is reduced slightly in this case, since the data cycle required for the error correction must be used when reading-in the data words, which is the price that must be paid for satisfactory system reliability in a single processor mode.

It is also proposed in accordance with the invention that bit errors are corrected by traditional error correction intended for correcting errors that can occur with accesses to different memories available to the processor structure.

This error correction is possible because respective data words are followed by a number of check bits, and because the check comprises matching the data bits in respective data words with following check bits, and because possible error correction of a data word that contains a bit error can be achieved through the check bits following respective data words.

It is also proposed in accordance with the invention that a processor that is adapted to operate in accordance with the inventive method shall be based on a processor structure that includes a first and a second calculating unit that can operate in parallel, a first read unit whereby data words belonging to instructions can be read into the first calculating unit, and a second read unit whereby data words belonging to instructions can be read into the second calculating unit.

The processor structure shall also include a third and a fourth calculating unit, whereby bit errors in data words read into respective first and second calculating units can be checked continuously, a comparator whereby output data from the parallel-operating calculating units can be compared, a diagnostic unit which functions to ascertain which calculating unit has delivered correct output data when a difference is detected in said comparator, and a control unit which functions to ensure that output data from said processor structure will derive from a calculating unit that has delivered correct output data.

According to another embodiment of the invention, the two parallel operating calculating units are adapted to wait for the result of the determination when a difference is detected in the comparator, whereafter the calculating unit that has delivered correct output data continues to operate after the determination result has been obtained, whilst the calculating unit that delivered incorrect output data is stopped and subjected to a start-up routine.

The stopped calculating unit can be brought into phase with the calculating unit that continues to operate through this start-up routine, whereafter the stopped calculating unit can be restarted for parallel operation with the calculating unit that was not stopped.

On the basis of such a processor, it is proposed in accordance with the present invention that whilst both the first and the second calculating units operate in parallel, data words can be read directly into respective calculating units without correction for possible bit errors, and that the information is available in respect of the determination process.

According to another embodiment, the diagnostic unit is adapted to utilize the information that shows whether a data word read into one of the two parallel operating calculating units contained a bit error, by considering the output data from said calculating unit to be incorrect when a data word containing a bit error is read into one of said two parallel operating calculating units.

Whilst one of the two parallel operating calculating units is stopped, the third or the fourth calculating unit functions to utilize the information for error correction of bit errors in any erroneous data words that are read in, prior to respective data words being read into the first or the second calculating unit operating in a single mode.

The third and the fourth calculating units are adapted to carry out the error correction.

With the intention of enabling earlier known techniques to be used, it is proposed in accordance with the present invention that the third and fourth calculating units are adapted to carry out an error correction that is comprised of a traditional error correction intended to correct errors that can arise when accessing different memories available to the processor structure.

This can be achieved by following respective data words with a plurality of check bits and in that the bit error check is comprised of matching the data bits in respective data words with following check bits, and in that the third and fourth calculating unit is adapted to carry out any error correction of a data word that includes a bit error through the medium of the check bits following respective data words.
Advantages Those advantages primarily characteristic of a method and a processor according to the present invention reside primarily in the significant reduction in the time taken to read instructions into the processor.

Another advantage is that the diagnosing process or determination process is very simple and can be effected rapidly in those instances when the error is due to the input of an erroneous data word, since all that is necessary in such cases is to establish into which processor an erroneous data word has been read-in as indicated by the error correction algorithm.

The primary characteristic features of an inventive method are set forth in the characterising clause of the following Claim 1, while the primary characteristic features of an inventive processor are set forth in the characterising clause of the following Claim 8.

BRIEF DESCRIPTION OF THE DRAWINGS

A method and a processor having features characteristic of the present invention will now be described in more detail by way of example, with reference to the accompanying drawing, in which FIG. 1 is a highly simplified and schematic illustration of an inventive processor structure;

FIG. 2 is a simplified illustration of the structure of a data word with following check bits; and FIG. 3 is a highly simplified, schematic illustration of part of a processor structure where data words are read into two parallel operating calculating units from a common memory.

DETAILED DESCRIPTION OF EMBODIMENTS
AT PRESENT PREFERRED

Shown in FIG. 1 is a processor 1 having a structure which includes a first calculating unit 11 and a second calculating unit 11' that operate in parallel with one another, a first reading unit 12 which is adapted to read into the first calculating unit a first data word belonging to instructions A, and a second reading unit 12' which is adapted to read into the second calculating unit 11' a second data word belonging to instructions A'.

The first and the second data words are one and the same data word, but stored in different memories.

A third calculating unit 13 is adapted to continuously carry out a check "a" on possible bit errors in data words read into the first calculating unit 11. Similarly, a fourth calculating unit 13' is adapted to continuously carry out a check "a'" of any bit errors in data words read into the second calculating unit 11'.

The illustrated processor structure includes a comparator 14 which is adapted to compare the output data "b", "b'" from the parallel operating calculating units 11, 11', a diagnostic unit 15 which is adapted to ascertain which calculating unit 11, 11' has delivered correct output data when said comparator 14 detects a difference "c", and a control unit 16 which is adapted to control so that the output data from the processor structure 1 will originate from the calculating unit of said two calculating units 11, 11' that delivered correct output data in accordance with information "d" from the diagnostic unit 15.

Because the manner in which a diagnosis or determination as to which of two calculating units has delivered incorrect data when the two calculating units deliver different output data is known, such determination will not be described in more detail in this document.

In known techniques, the two parallel operating calculating units 11, 11' wait for the result of the diagnosis or determination "e" when a difference is detected in the comparator 14, whereafter the calculating unit, e.g. the first calculating unit 11, that has delivered correct output data continues to operate after receipt of the result of the determination "e", and the calculating unit, in the illustrated case the second calculating unit 11', that has delivered incorrect output data is stopped and subjected to a start-up routine, wherewith the stopped calculating unit 11' is brought into phase with the calculating unit 11 that continues to operate.

Subsequent to bringing the stopped calculating unit 11' into phase with the still operating calculating unit 11, the stopped calculating unit 11' is restarted for parallel operation with the calculating unit 11 that was not stopped.

to one preferred embodiment of the present invention, when the processor is operating in a double processor mode, i.e. while the first and the second calculating units 11, 11' both operate in parallel, data words are read directly into respective calculating units without correction for possible bit errors. This obviates the need to wait for the result from the bit error correction, therewith saving one data cycle with each memory access.

The third and the fourth calculating units 13, 13' continuously check data words read into respective calculating units for bit error, although the processor does not wait for the result of this check. The information resulting from this check is made available to the diagnostic unit 15 on conductors "f" and "f'", where the information is used in a later stage of determining the error causes when a difference is detected in the comparator 14.

This information shows whether a data word read into one of the two parallel operating calculating units 11, 11', is utilized by considering the output data from this calculating unit to be incorrect, therewith greatly simplifying determination in the diagnostic unit 15 in such instances.

In the case of single processor mode, i.e. when one of the two parallel operating calculating units 11, 11' is stopped and the other one is a lone operating calculating unit, the result "g", "g'" is awaited from the third of fourth calculating unit 13, 13' and possible bit error corrections of a possible erroneous data word read into said calculating unit before reading respective data words into the single operating first or second calculating unit. The third and the fourth calculating unit 13, 13' are also adapted to correct bit errors.

There is nothing to prevent the error correction being effected by a traditional error correction intended for correcting errors that can occur when accessing different memories A, B, C, D and A', B, C', D', respectively, available to the processor structure 1.

As will be evident from FIG. 2, it is possible to utilize a structure 3 for used data words where respective data words 31 are followed by a number of check bits 32. The Figure illustrates an example of a data word 31 that includes eight data bits with three following check bits 32. The check may conveniently consist in matching the data bits 31 in respective data words with following check bits 32 in accordance with a predetermined algorithm, and any error correction of a data word 31 that contains a bit error can be effected through the check bits 32 that follow respective data words.

In the FIG. 1 illustration, the first data word is read from a first memory A and the second data word is read from a second memory A' separate from the first memory A.

However, the first data word and the second data word may consist in one and the same data word read from a common memory A" in accordance with FIG. 3.

A processor that shall be capable of operating in accordance with an inventive method shall have the structure shown in FIG. 1 and including:

a first and a second calculating unit 11, 11' that can operate parallel with one another;

a first read unit 12 by means of which a first data word belonging to instructions A can be read into the first calculating unit 11;

a second read unit 12' by means of which a second data word belonging to instructions A' can be read into the second calculating unit 11';

a third calculating unit 13 by means of which a bit error check can be carried out continuously in the first data word read into the first calculating unit 11;

a fourth calculating unit 13' by means of which a bit error check can be carried out continuously in the second data word read into the second calculating unit 11';

a comparator 14 in which output data from the parallel operating calculating units 11, 11' can be compared;

a diagnostic unit 15 by means of which the calculating unit 11, 11' that has delivered correct output data can be determined when the comparator 14 detects a difference in said output data; and a control unit 16 by means of which it is possible to effect control so that the output data from the processor structure 1 will originate from a calculating unit 11, 11' that has delivered correct output data, and which receives from the diagnostic unit 15, e.g. via a conductor d, information as to which of the calculating units 11, 11' delivered correct output data.

The two parallel operating calculating units 11, 11' are adapted to await the result of an determination carried out by the diagnostic unit 15 when a difference is detected in the comparator 14, whereafter the calculating unit, e.g. the first calculating unit 11, that delivered correct output data can be caused to continue to operate after receiving the result of the determination, whereas the calculating unit that delivered incorrect output data, in the illustrated case the second calculating unit 11', can be stopped and subjected to a start-up routine, wherewith the stopped calculating unit 11' can be brought into phase with the still operating calculating unit 11, whereafter the stopped calculating unit 11' can be restarted for parallel operation with the calculating unit 11 that was not stopped.

An inventive processor shall be particularly adapted so that when operating in a double processor mode, i.e. when both the first and the second calculating units 11, 11' operate parallel with one another, respective data words can be read directly into respective calculating units without being corrected for possible bit errors.

In such a processor, information originating from the check carried out continuously by the third and fourth calculating units 13, 13' respectively shall be available to the diagnostic unit 15, for instance on a respective conductor f and f', for use in the determination or appraisal carried out by the diagnostic unit 15, said information showing whether or not a data word read into one of said two parallel operating calculating units 11, 11' contained a bit error.

In the event of a data word that contains a bit error being read into one of the two parallel operating units 11, 11', the diagnostic unit 15 is adapted to utilize said information by considering the output data from this calculating unit to be incorrect.

An inventive processor shall also be adapted so that when operating in the single processor mode, i.e. when one of the two parallel operating calculating units is stopped, e.g. the second calculating unit 11', the third calculating unit 13 will utilize said information for error correction of a bit error of an erroneous read-in data word before respective data words are read into the first calculating unit 11, which in this example operates in a single processor mode, for correcting possible erroneous data words that have been read in.

According to the earlier described method, there is nothing to prevent the third and the fourth calculating unit 13, 13' from being adapted to carry out an error correction consisting of a traditional error correction intended to correct errors that occur when accessing different memories A, B, C, D and A', B', C', D', respectively, accessible to the processor structure 1.

For instance, an inventive processor can be adapted to handle data words where, according to FIG. 2, respective data words 31 are followed by a number of check bits 32, and where the check consists in matching the data bits in respective data words with following check bits. In such an embodiment, the third calculating unit 13 shall be adapted to carry out possible error correction of a data word 31 that contains a bit error through the medium of the check bits 32 following respective data words 31.

In the FIG. 1 embodiment, the first read unit 12 is adapted to read from first memory A and the second read unit 12' is adapted to read from a second memory A', separate from the first memory A.

It will be understood, however, that the first and the second data word may well consist of one and the same data word, wherewith both the first read unit 12 and the second read unit 12' are adapted to read the same data word from a common memory A" in accordance with FIG. 3.

The invention means that several erroneous instructions will be read into the processor, which may be thought to have a deleterious effect on system reliability.

This will result in several erroneous results from each of the calculating units when the processor operates in a double processor mode. This increase in erroneously performed instructions, however, will consist in readily diagnosed errors, since the information originating from the third and the fourth calculating unit respectively will indicate directly which of the two parallel operating calculating units has delivered the erroneous result.

The total time gain and the advantages afforded by the invention outweigh this deleterious effect.

It will be understood that the invention is not restricted to the afore described exemplifying embodiment thereof and that modifications can be made within the scope of the inventive concept as illustrated in the following Claims.

What is claimed is:

1. A method of utilizing information that is made available when making a bit error check in data words that belong to instructions read into a processor, comprising the steps of:

processing data, wherein said processor has a structure which includes a first and a second calculating unit that operate in parallel with one another, a first read unit adapted to read a first data word into said first calculating unit, a second read unit adapted to read a second data word into said second calculating unit, a third calculating unit, which also receives said first data word, adapted to continuously carry out said bit error check in said first data word, a fourth calculating unit which also receives said second data word adapted to continuously carry out said bit error check in said second data word;

comparing, using a comparator, output data from said first and second calculating units;

determining, using a diagnostic unit, from which calculating unit correct output data was delivered when the comparator detects a difference in said output data; and controlling, using a control unit, which data that is outputted from the processor will originate from one of said calculating units that delivers correct output data, wherein said first and second calculating units await the result of said determination when the comparator detects a difference in said output data, whereafter the calculating unit that delivered correct output data continues to operate after a result of said determination has been obtained, whereas the calculating unit that delivered incorrect output data is stopped and subjected to a start-up routine in which said stopped calculating unit is brought into phase with the calculating unit that still operates, whereafter said stopped calculating unit is restarted for parallel operation with the calculating unit that was not stopped, wherein when said first and said second calculating units operate in parallel with one another, said data words are read directly into respective first and second calculating units without correction for possible bit errors; and in that said output data from said first and second calculating units are utilized in said determination process.

2. A method according to claim 1, wherein when a data word that contains a bit error is read into one of said first and second calculating units, information that shows whether or not a data word read into one of said first and second calculating units contained a bit error is utilized by considering the output data from that calculating unit to be incorrect.

3. A method according to claim 2, wherein respective data words are followed by a number of check bits; in that checking for bit errors comprises comparing the data bits in respective data words with following check bits; and in that any error correction of a data word that includes a bit error is accomplished by utilizing the check bits following respective data words.

4. A method according to claim 1, wherein while one of said first and second calculating units is stopped, a correction is made on a bit error of a possible erroneous data word read into the processor prior to respective data words being read into the operating calculating unit; and in that said third and said fourth calculating unit are adapted to carry out said error correction.

5. A method according to claim 4, wherein said error correction comprises a traditional error correction intended for correcting errors that can occur when accessing different memories available to the processor structure.

6. A method according to claim 5, wherein respective data words are followed by a number of check bits; in that checking for bit errors comprises comparing the data bits in respective data words with following check bits; and in that any error correction of a data word that includes a bit error is accomplished by utilizing the check bits following respective data words.

7. A method according to claim 4, wherein respective data words are followed by a number of check bits; in that checking for bit errors comprises comparing the data bits in respective data words with following check bits; and in that any error correction of a data word that includes a bit error is accomplished by utilizing the check bits following respective data words.

8. A method according to claim 1, wherein respective data words are followed by a number of check bits; in that checking for bit errors comprises comparing the data bits in respective data words with following check bits; and in that any error correction of a data word that includes a bit error is accomplished by utilizing the check bits following respective data words.

9. A method according to claim 1, wherein the first data word is read from a first memory and in that said second data word is read from a second memory separate from said first memory.

10. A method according to claim 1, wherein said first and second data words consist of the same data word read from a common memory.

11. A processor comprising: a structure which includes a first and a second calculating unit which can operate in parallel with one another, a first read unit whereby a first data word belonging to instructions can be read into said first calculating unit, a second read unit whereby a second data word belonging to said instructions can be read into said second calculating unit, a third calculating unit which also receives said first data word whereby a bit error check can be carried out continuously in said first data word, a fourth calculating unit which also receives said second data word whereby a bit error check can be carried out continuously in said second data word, a comparator in which output data from said first and second calculating units can be compared, a diagnostic unit in which the calculating unit that delivers correct output data can be determined when a difference between output data is detected in said comparator, and a control unit capable of effecting control such that the output data from said processor structure originates from a calculating unit that has delivered correct output data, wherein said first and second calculating units are adapted to await said determination when a difference is detected in said comparator, whereafter the calculating unit that has delivered correct output data is adapted to continue to operate after the result of said determination has been obtained whereas the calculating unit that delivered incorrect output data can be stopped and subjected to a start-up routine, and wherein said stopped calculating unit can be brought into phase with the still operating calculating unit, whereafter said stopped calculating unit can be restarted for parallel operation with the unit that was not stopped, wherein while the two first and second calculating units operate in parallel with one another, the first and second data words can be read directly into respective first and second calculating units without correction for possible bit errors; and in that said output data from said first and second calculating units are available to said determination process.

12. A processor according to claim 11, wherein the diagnostic unit is adapted to utilize information showing whether or not a data word read into one of said first and second calculating units contained a bit error by considering the output data from this calculating unit to be incorrect when a data word containing a bit error is read into one of said first and second calculating units.

13. A processor according to claim 12, wherein respective data words are adapted to be followed by a number of check bits; in that checking for bit errors comprises comparing the data bits in respective data words with following, check bits; and in that said third and said fourth calculating units are adapted to carry out possible error corrections of a data word that includes a bit error is accomplished by utilizing the check bits following respective data words.

14. A processor according to claim 11, wherein whilst one of said first and second calculating units is stopped, said third and fourth calculating units respectively are adapted to utilize said information to correct a bit error in a possible erroneous read-in data words prior to respective data words being read into the operating calculating unit; and in that said third and fourth calculating units are adapted to carry out said error correction.

15. A processor according to claim 14, wherein said third and said fourth calculating unit are adapted to carry out an error correction that comprises a traditional error correction intended for correcting errors that can occur when accessing different memories available to said processor structure.

16. A processor according to claim 15, wherein respective data words are adapted to be followed by a number of check bits; in that checking for bit errors comprises comparing the data bits in respective data words with following check bits; and in that said third and said fourth calculating units are adapted to carry out possible error corrections of a data word that includes a bit error is accomplished by utilizing the check bits following respective data words.

17. A processor according to claim 14, wherein respective data words are adapted to be followed by a number of check bits; in that checking for bit errors comprises comparing the data bits in respective data words with following check bits; and in that said third and said fourth calculating units are adapted to carry out possible error corrections of a data word that includes a bit error is accomplished by utilizing the check bits following respective data words.

18. A processor according to claim 11, wherein respective data words are adapted to be followed by a number of check bits; in that checking for bit errors comprises comparing the data bits in respective data words with following check bits; and in that said third and said fourth calculating units are adapted to carry out possible error corrections of a data word that includes a bit error is accomplished by utilizing the check bits following respective data words.

19. A processor according to claim 11, wherein said first read unit is adapted to read from a first memory; and in that said second read unit is adapted to read from a second memory separate from said first memory.

20. A processor according to claim 11, wherein said first and said second data words are one and the same data word; and in that said first read unit and said second read unit are both adapted to read the same data words from a common memory.

* * * * *